United States Patent
Bai et al.

(10) Patent No.: US 12,112,424 B2
(45) Date of Patent: Oct. 8, 2024

(54) SYSTEMS AND METHODS FOR CONSTRUCTING 3D MODEL BASED ON CHANGING VIEWPIONT

(71) Applicant: Realsee (Beijing) Technology Co., Ltd., Beijing (CN)

(72) Inventors: Jie Bai, Beijing (CN); Yi Zhu, Beijing (CN); Dufang Xie, Beijing (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 171 days.

(21) Appl. No.: 17/731,243

(22) Filed: Apr. 27, 2022

(65) Prior Publication Data

US 2023/0063465 A1    Mar. 2, 2023

(30) Foreign Application Priority Data

Aug. 31, 2021 (CN) .......................... 202111007869.5

(51) Int. Cl.
- *G06T 15/20* (2011.01)
- *G06T 3/40* (2024.01)
- *G06T 17/00* (2006.01)

(52) U.S. Cl.
CPC ............... *G06T 15/20* (2013.01); *G06T 3/40* (2013.01); *G06T 17/00* (2013.01); *G06T 2207/30196* (2013.01); *G06T 2210/04* (2013.01)

(58) Field of Classification Search
CPC ..... G06T 15/20; G06T 17/00; G06T 2210/04; G06T 3/40; G06T 2207/30196
See application file for complete search history.

(56) References Cited

U.S. PATENT DOCUMENTS

| | | | | |
|---|---|---|---|---|
| 6,671,400 | B1 * | 12/2003 | Ekpar | H04N 23/698 382/157 |
| 9,189,891 | B2 * | 11/2015 | Hernandez Esteban | G01C 21/3638 |
| 10,636,158 | B1 * | 4/2020 | Kamiyama | G06T 7/50 |
| 11,076,253 | B2 * | 7/2021 | Laaksonen | A63F 13/525 |

(Continued)

OTHER PUBLICATIONS

Jung et al., "Deep360Up—A Deep Learning-Based Approach for Automatic VR Image Upright Adjustment", 2019, IEEE (Year: 2019).*

(Continued)

*Primary Examiner* — YuJang Tswei
(74) *Attorney, Agent, or Firm* — BAYES PLLC

(57) ABSTRACT

Systems and methods for constructing a panoramic view based on a changing viewpoint are disclosed. An exemplary system includes a storage device configured to receive first image data of a scene for a first viewpoint at a first predetermined elevation. The system further includes at least one processor configured to convert the first image data to candidate image data for at one or more second predetermined elevations using a deep learning neural network. The at least one processor is further configured to receive a user view request for virtually viewing the scene and determine second image data for a second viewpoint associated with the user view request, by mapping the second viewpoint to the one or more second predetermined elevations. The at least one processor is also configured to render the three-dimensional model of the scene based on the second image data and display the panoramic view in response to the user view request.

20 Claims, 7 Drawing Sheets

(56) References Cited

U.S. PATENT DOCUMENTS

| | | | |
|---|---|---|---|
| 11,409,279 B1* | 8/2022 | Solenberg | G05D 1/0016 |
| 2010/0030578 A1* | 2/2010 | Siddique | H04W 4/00 |
| | | | 705/26.1 |
| 2013/0215116 A1* | 8/2013 | Siddique | G06Q 20/40 |
| | | | 705/26.7 |
| 2015/0269785 A1* | 9/2015 | Bell | G06T 13/80 |
| | | | 345/427 |
| 2016/0026253 A1* | 1/2016 | Bradski | H04N 13/128 |
| | | | 345/8 |
| 2016/0063671 A1* | 3/2016 | Piippo | G01C 21/3647 |
| | | | 345/676 |
| 2016/0210602 A1* | 7/2016 | Siddique | G06Q 20/047 |
| 2019/0011922 A1* | 1/2019 | Feng | G05D 1/0094 |
| 2020/0267492 A1* | 8/2020 | Laaksonen | A63F 13/525 |
| 2021/0056662 A1* | 2/2021 | Ogasawara | G06F 3/04845 |
| 2021/0117071 A1* | 4/2021 | Gharpuray | G06F 3/04815 |
| 2021/0225065 A1* | 7/2021 | Holzer | H04N 13/282 |
| 2022/0172127 A1* | 6/2022 | Cui | H04R 1/08 |

OTHER PUBLICATIONS

DuLa-Net—A Dual-Projection Network for Estimating Room Layouts from a Single RGB Panorama—Aug. 19, 2021—National Tsing Hua University—Yang et al (Year: 2021).*

\* cited by examiner

SYSTEMS AND METHODS FOR CONSTRUCTING 3D MODEL BASED ON CHANGING VIEWPIONT

CROSS-REFERENCE OF RELATED APPLICATIONS

This application hereby claims the benefits of priority to Chinese Application No. 202111007869.5 filed on Aug. 31, 2021, which is hereby incorporated by reference in its entirety.

TECHNICAL FIELD

The present disclosure relates to systems and methods for constructing a three-dimensional (3D) model of a property for a user to view virtually, and more particularly, to systems and methods for adaptively constructing a 3D model for a changing viewpoint determined based on a user view request.

BACKGROUND

In the real estate market, when a person wants to buy or rent a property, he typically would ask to tour the property first in order to visually experience the layout and furnishing. Virtual Reality (VR) technology has been applied to conduct these tours virtually. Videos, images, and point cloud data of the property are taken in advance. A 3D model is rendered based on the point cloud data and/or the images. As a result, a visitor can remotely view the property without having to do it in person.

3D model reconstructs a scene using VR technology based on images captured by an image acquisition device at a certain elevation. Therefore, the reconstructed 3D model shows a scene viewed from a viewpoint at the same elevation of the acquisition device. For example, the acquisition device may be mounted on a tripod or handheld by a user, and thus its elevation is set by the height of the tripod or the user. When the acquisition device is set at an elevation, e.g., 160 cm from the floor, the model of scene rendered from the images acquired by this acquisition device has a corresponding viewpoint at 160 cm high. However, when the model is displayed to a user to provide a virtual tour of the property, depending on the user's height, the user may need to view the scene at a viewpoint at a different elevation, for example, 150 cm or 170 cm from floor. Existing VR tours cannot adaptively adjust the model to suit the needs of user view requests from users of different heights. As a result, user experience is impaired.

SUMMARY

Embodiments of the disclosure improve the existing three-dimensional model construction systems and methods by converting image data for a first viewpoint at a first elevation to image data of second viewpoint at a second elevation suitable for the user height.

In one aspect, a system for constructing a three-dimensional model based on a changing viewpoint is disclosed. An exemplary system includes a storage device configured to receive first image data of a scene for a first viewpoint at a first predetermined elevation. The system further includes at least one processor configured to convert the first image data to candidate image data for at one or more second predetermined elevations using a deep learning neural network. The at least one processor is further configured to receive a user view request for virtually viewing the scene and determine second image data for a second viewpoint associated with the user view request, by mapping the second viewpoint to the one or more second predetermined elevations. The at least one processor is also configured to render the panoramic view of the scene based on the second image data and display the panoramic view in response to the user view request.

In another aspect, a computer-implemented method for constructing a panoramic view based on a changing viewpoint are disclosed is disclosed. An exemplary method includes receiving receive first image data of a scene for a first viewpoint at a first predetermined elevation. The method further includes converting, by at least one processor, the first image data to candidate image data for at one or more second predetermined elevations using a deep learning neural network. The method also includes receiving a user view request for virtually viewing the scene and determining, by the at least one processor, second image data for a second viewpoint associated with the user view request, by mapping the second viewpoint to the one or more second predetermined elevations. The method additionally includes rendering the panoramic view of the scene based on the second image data and displaying the panoramic view in response to the user view request.

In yet another aspect, a non-transitory computer-readable medium having stored thereon computer instructions is disclosed. The computer instructions, when executed by at least one processor, perform a method for constructing a panoramic view based on a changing viewpoint are disclosed is disclosed. An exemplary method includes receiving receive first image data of a scene for a first viewpoint at a first predetermined elevation. The method further includes converting the first image data to candidate image data for at one or more second predetermined elevations using a deep learning neural network. The method also includes receiving a user view request for virtually viewing the scene and determining second image data for a second viewpoint associated with the user view request, by mapping the second viewpoint to the one or more second predetermined elevations. The method additionally includes rendering the panoramic view of the scene based on the second image data and displaying the panoramic view in response to the user view request.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
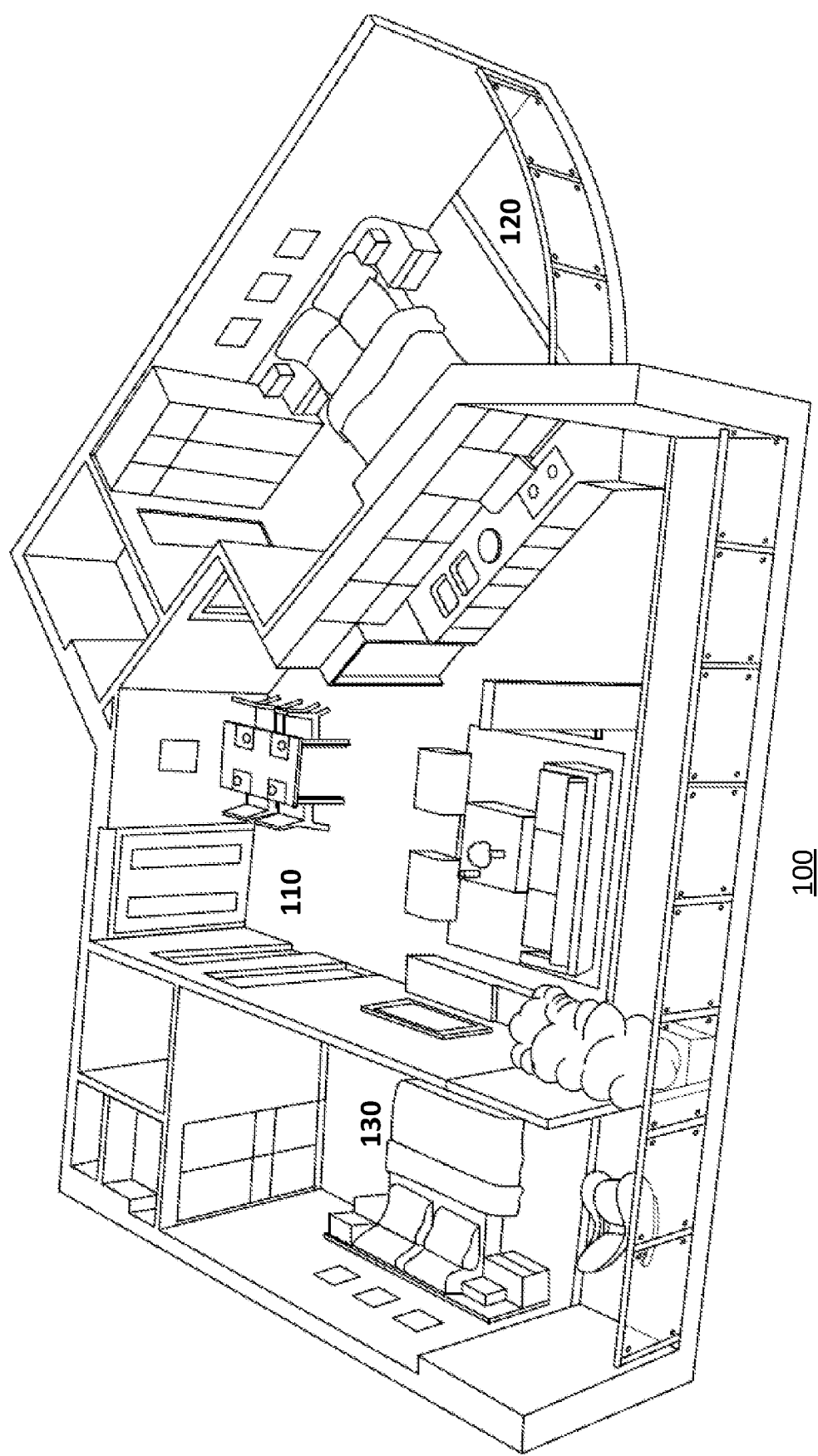
FIG. 1 illustrates a schematic diagram of an exemplary three-dimensional model of a real state property, according to embodiments of the disclosure.

FIG. 1 illustrates a schematic diagram of an exemplary three-dimensional model 100 of a real estate property, according to embodiments of the disclosure. In some embodiments, three-dimensional model 100 may be a model of a property, such as a house, an apartment, a townhouse, a garage, a warehouse, an office building, a hotel, and a store, etc. As shown in FIG. 1, three-dimensional model 100 virtually recreates the real-world property including its layout (e.g., the framing structures that divide the property into several rooms such as walls and counters), finishing (e.g., kitchen/bathroom cabinets, bathtub, island, etc.), fixtures installed (e.g., appliances, window treatments, chandeliers, etc.), and furniture and decorations (e.g., beds, desks, tables and chairs, sofas, TV stands, bookshelves, wall paintings, mirrors, plants, etc.)

In some embodiments, the property may include multiple rooms or functional spaces separated by interior walls. Each room or space may be an object. For example, the object may be a living room, bedroom, dining room, kitchen, bathroom, etc. of the property. Three-dimensional model 100 may accordingly include several sub-models corresponding to the different rooms or spaces. For example, three-dimensional model 100 may include a sub-model 110 for a great room that has combined functions of a living room and a kitchen. As another example, three-dimensional model 100 may further include sub-models 120 and 130 for the two bedrooms.

Three-dimensional model 100 and each of its sub-model may be a three-dimensional model rendered from image data (such as point cloud data) acquired of the object. The image data may be acquired at a viewpoint from different view angles. The image data are then post-processed and merged to render the three-dimensional model. For example, FIG. 2 illustrates an exemplary process of acquiring images of a scene at a first viewpoint, according to embodiments of the disclosure.

In some embodiments, the image data (such as point clouds) of a scene is generally acquired by 3D scanners, which survey the external surface surrounding objects in the scene. FIG. 2 shows 3D scanners 210 used for acquiring the image data of the scene (e.g., the great room of a property). Consistent with the present disclosure, 3D scanner 210 may be selected from a RGB-D device, a 2D/3D LiDAR, a stereo camera, a time-of-flight (ToF) camera, etc. 3D scanner 210 may acquire depth information as well as color information.

In some embodiments, image data may be acquired at a first viewpoint of a first predetermined elevation. For example, as shown in FIG. 2, image data of the great room may be acquired by 3D scanner 210 from first viewpoint 232 at a predetermined elevation. In some embodiments, the predetermined elevation may be set by the tripod or other equipment to support and stabilized 3D scanner 210. In some alternative embodiments, the predetermined elevation may be set by the height of a user (e.g., photographer/videographer) holding 3D scanner 210. For example, the predetermined elevation may be 160 cm above the floor when 3D scanner 210 is held by a user. It is contemplated that the predetermined elevation can be any suitable height values, determined as appropriate for the specific scene being modeled. For example, if the scene is filled with taller objects, such as dressers, standing lamps, etc., the predetermined elevation can be set higher. Otherwise, if the scene has mostly shorter objects, such as couches and coffee tables, the predetermined elevation can be set higher. In some embodiments, 3D scanner 210 may acquire image data from different view angles by rotating itself at the viewpoint.

Figure 2:
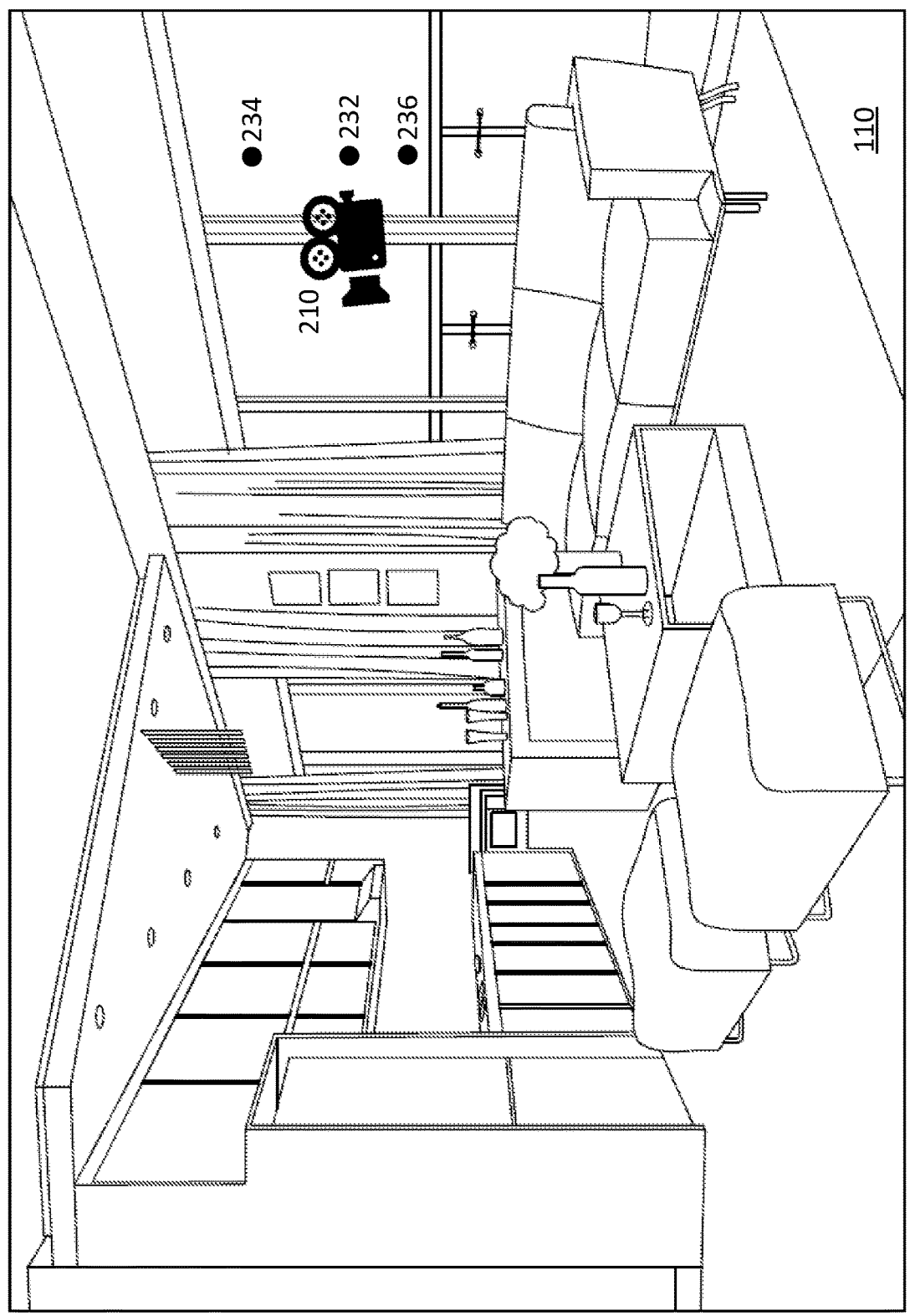
FIG. 2 illustrates an exemplary process of acquiring images of a scene at a first viewpoint, according to embodiments of the disclosure.

Although the exemplary three-dimensional models shown in FIG. 1 and FIG. 2 illustrate only indoor space and structures, it is contemplated that the model could also include outdoor space and structures, such as the deck, the front/back yard, the garage, as well as the neighboring environment. A person of ordinary skill can adapt the disclosed systems and methods without undue experimentation for outdoor showings.

While image data is acquired at a first predetermined elevation (e.g., viewpoint 232), the rendered panoramic view may be displayed to users of a VR application of different heights. That is, when touring the property in person, each user will view the scene at his/her different eye height (e.g., viewpoints 234 and 236). Therefore, the panoramic view should be rendered for different viewpoints dictated by the different heights of the users. For example, viewpoint 234 may be at a higher elevation than viewpoint 232 and viewpoint 236 may be at a lower elevation than viewpoint 232. To solve the technical problem, this disclosure provides methods and systems for adaptively constructing panoramic views based on changing viewpoints, to accommodate the viewing needs of different users of different heights.

Figure 3:
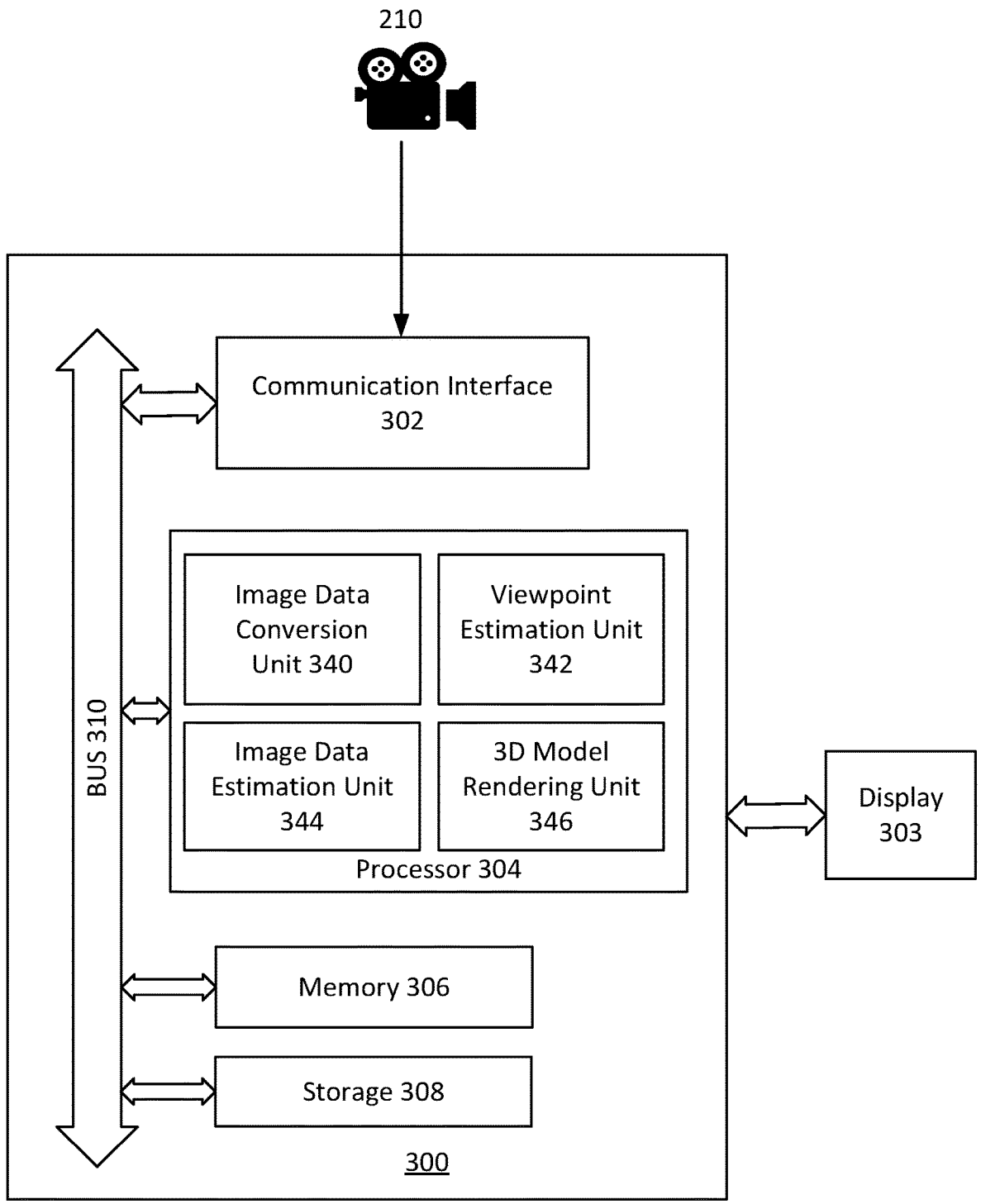
FIG. 3 is a block diagram of an exemplary system for constructing a panoramic view for a second viewpoint, according to embodiments of the disclosure.

FIG. 3 is a block diagram of an exemplary system for constructing a panoramic view for a second viewpoint, according to embodiments of the disclosure. In some embodiments, system 300 may be implemented by a physical server or a service in the cloud. In some other embodiments, system 300 may be implemented by a computer or a consumer electronic device such as a mobile phone, a pad, or a wearable device.

In yet some other embodiments, system 300 may be implemented by multiple devices or multiple processors of the same device. As shown in FIG. 3, system 300 may include a communication interface 302, a processor 304, a memory 306, a storage 308, and a bus 310. In some embodiments, system 300 may have different modules in a single device, such as an integrated circuit (IC) chip (implemented as an application-specific integrated circuit (ASIC) or a field-programmable gate array (FPGA)), or separate devices with dedicated functions. Components of system 300 may be in an integrated device, or distributed at different locations but communicate with each other through a network (not shown). The various components of system 300 may be connected to and communicate with each other through bus 310.

Communication interface 302 may receive and send data from components such as 3D scanner 210 or a database storing acquired image data via direct communication links, a Wireless Local Area Network (WLAN), a Wide Area Network (WAN), wireless communication networks using radio waves, a cellular network, and/or a local wireless network (e.g., Bluetooth™ or WiFi), or other communication methods. In some embodiments, communication interface 302 can be an integrated services digital network (ISDN) card, cable modem, satellite modem, or a modem to provide a data communication connection. As another example, communication interface 302 can be a local area network (LAN) card to provide a data communication connection to a compatible LAN. Wireless links can also be implemented by communication interface 302. In such an implementation, communication interface 302 can send and receive electrical, electromagnetic or optical signals that carry digital data streams representing various types of information via a network.

Consistent with some embodiments, communication interface 302 may receive image data capturing a scene. In some embodiments, image data may be acquired by an acquisition device, such as 3D scanner 210, at a first viewpoint at a first predetermined elevation. In some embodiments, the image data may not be acquired data but computer simulated image data, e.g., from an existing three-dimensional model of the scene. Communication interface 302 may provide the received information or data to memory 306 and/or storage 308 for storage or to processor 304 for processing.

Processor 304 may include any appropriate type of general-purpose or special-purpose microprocessor, digital signal processor, or microcontroller. Processor 304 may be configured as a separate processor module dedicated to constructing 3D panorama models in order to provide a VR house tour. Alternatively, processor 304 may be configured as a shared processor module for performing other functions related to or unrelated to 3D model construction. For example, VR house tour is just one application installed on a versatile device.

As shown in FIG. 3, processor 304 may include multiple modules, such as an image data conversion unit 340, a viewpoint estimation unit 342, an image data estimation unit 344, and a 3D model rendering unit 346, and the like. These modules (and any corresponding sub-modules or sub-units) can be hardware units (e.g., portions of an integrated circuit) of processor 304 designed for use with other components or to execute part of a program. The program may be stored on a computer-readable medium (e.g., memory 306 and/or storage 308), and when executed by processor 304, it may perform one or more functions. Although FIG. 3 shows units 340-346 all within one processor 304, it is contemplated that these units may be distributed among multiple processors located near or remotely with each other. In some embodiments, image data conversion unit 340 may be on a separate processor from processor 304 and performs the image data conversion beforehand, while viewpoint estimation unit 342, image data estimation unit 344, and 3D model rendering unit 346 construct the 3D model in real-time.

Memory 306 and storage 308 may include any appropriate type of mass storage provided to store any type of information that processor 304 may need to operate. Memory 306 and storage 308 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 306 and/or storage 308 may be configured to store one or more computer programs that may be executed by processor 304 to perform point cloud registration and panorama model construction disclosed herein. For example, memory 306 and/or storage 308 may be configured to store program(s) that may be executed by processor 304 to convert image data for a first viewpoint at a first elevation to image data for a second viewpoint at a second elevation using a deep learning neural network, and then render the 3D view in response to a user view request using the converted image data suitable for the user's height.

Memory 306 and/or storage 308 may be further configured to store information and data used by processor 304. For instance, memory 306 and/or storage 308 may be configured to store the image data for the various viewpoints at different elevations, and the deep learning neural network used for image data conversion. Memory 306 and/or storage 308 may also be configured to store intermediate data generated by processor 304, such as user heights, features extracted during the application of the deep learning neural network, and the parameters generated during the rendering of the 3D model. The various types of data may be stored permanently, removed periodically, or disregarded immediately after each point cloud is processed.

In some embodiments, system 300 may optionally include a display 303. In some embodiments, display 303 may be external to system 300 but be connected with system 300. Display 303 may display the panoramic views to the users. In some embodiments, display 303 may further function as a user interface to receive user input. Display 303 may include a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™. The user may interact with the displayed 3D model through display 303.

Figure 4:
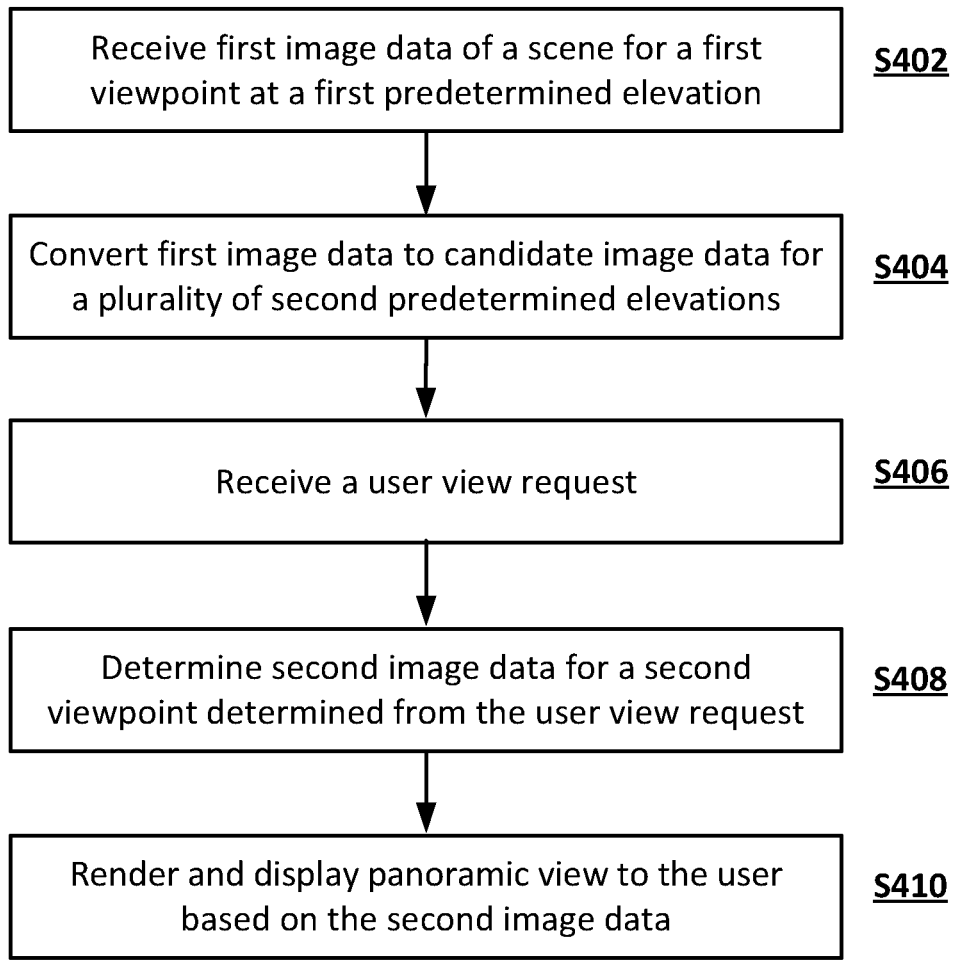
FIG. 4 is a flowchart of an exemplary method for constructing a panoramic view, according to embodiments of the disclosure.

The modules of processor 304 may be configured to execute program(s) stored in memory 306/storage 308 to perform a method for constructing a 3D model for a changing viewpoint in order to provide a VR tour to a user. For example, FIG. 4 is a flowchart of an exemplary method 400 for constructing a panoramic view, according to embodiments of the disclosure. Method 400 may include steps S402-S410 as described below. It is to be appreciated that some of the steps may be optional to perform the disclosure provided herein. Further, some of the steps may be performed simultaneously, or in a different order than shown in FIG. 4. For description purpose, method 400 will be described as to construct a 3D model 110 of a great room (as shown in FIG. 2) in response to a user view request. Method 400, however, can be implemented for constructing 3D models of other scenes, including other functional spaces of a property, or a scene that is non-related to a property, such as a garden, a landscape, etc.

In step S402, communication interface 302 may receive first image data of a scene for a first viewpoint at a first predetermined elevation. In some embodiments, the scene can be any space, e.g., a property, that can be captured by image acquisition. The image data may be, panoramic images, or point clouds, of the scene. The first determined elevation can be any suitable height from the floor or ground of the scene, e.g., 160 cm. In some embodiments, the first image data may be acquired by an acquisition device, such as 3D scanner 210, at a first viewpoint (e.g., viewpoint 232 in FIG. 2). In that case, the first predetermined elevation can be the elevation of the acquisition device when capturing the scene. For example, the acquisition device can be fixed on a tripod or held by a user. Accordingly, the first predetermined elevation can be the setup height of the acquisition device, or the height of the user's hand. In some embodiments, the image data may be prestored in storage 308. In yet some other embodiments, the image data may be simulated by computers from existing 3D models of the scene. In that case, the first predetermined elevation can be selected as any suitable value by the operator of the simulation.

In step S404, processor 304 may convert the first image data to candidate image data for a plurality of second predetermined elevations. In some embodiments, step S404 may be performed by image data conversion unit 340 using a deep learning neural network. Image data conversion unit 340 may select the plurality of second predetermined elevations. The second predetermined elevations can include any elevations for potential viewpoints for viewing the scene, for example, to cover the possible human height range. They can be near the first predetermined elevation or far from it. The conversion of image data can be based on a relationship between the first predetermined elevation and each first predetermined elevation. In some embodiments, the relationship can be a difference, a ratio, or a difference in percentage, etc., between the first and second predetermined elevations. An exemplary process for performing step S404 based on the difference between the first and second predetermined elevations is shown in FIG. 5.

Figure 5:
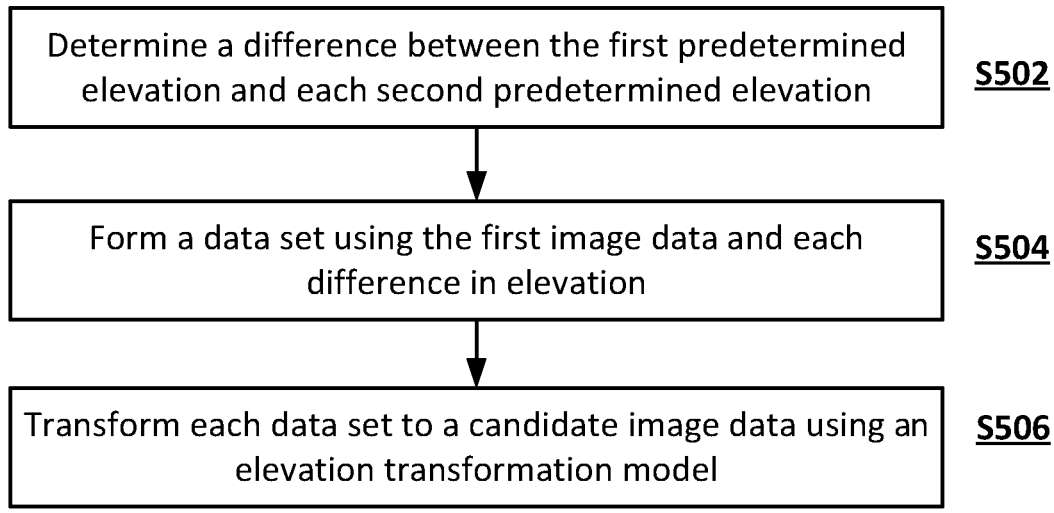
FIG. 5 is a flowchart of an exemplary method for converting image data for a first elevation to image data for a second elevation, according to embodiments of the disclosure.

FIG. 5 is a flowchart of an exemplary method 500 for converting image data for a first elevation to image data for a second elevation, according to embodiments of the disclosure. Method 500 may be implemented by image data conversion unit 340 to perform step S404 of method 400. Method 500 may include steps S502-S506 as described below. It is to be appreciated that some of the steps may be optional to perform the disclosure provided herein. Further, some of the steps may be performed simultaneously, or in a different order than shown in FIG. 5.

In step S502, image data conversion unit 340 determines a difference between the first and second predetermined elevations. When the second predetermined elevation is higher than the first predetermined elevation, the difference can be a positive value. For example, when the first predetermined elevation is 170 cm (e.g., at viewpoint 242 in FIG. 2) and the second predetermined elevation is 180 cm (e.g., at viewpoint 244 in FIG. 2), the difference between the two is 10 cm. When the second predetermined elevation is lower than the first predetermined elevation, the difference can be a negative value. For example, when the first predetermined elevation is 170 cm (e.g., at viewpoint 242 in FIG. 2) and the second predetermined elevation is 150 cm (e.g., at viewpoint 246 in FIG. 2), the difference between the two is −20 cm.

In step S504, image data conversion unit 340 forms a data set using the first image data and the difference in elevation. For example, each data set includes the first image data for the first predetermined elevation and the difference between the first predetermined elevation and a respective second predetermined elevation.

In step S506, image data conversion unit 340 transforms the data set to a candidate image data for the second predetermined elevation using an elevation transformation model. The elevation transformation model may take the data set (which includes the first image data and a difference in elevation) as input and provide the candidate image data for the second predetermined elevation as output. The elevation transformation model may be a deep learning neural network, trained to perform the image data conversion between different elevations. By using a pre-trained neural network for the conversion, the conversion can be accurately and efficiently performed in batches.

In some embodiments, the elevation transformation model can be trained by processor 304 or a processor of a different device using training data. The training data may a set of image data each capturing a same sample scene from a viewpoint at a different elevation. The image data for training can be acquired by acquisition device or simulated by computers. During training, image data for every two different elevations are selected to form a training sample. In some embodiments, each training sample may include the image data of a first elevation and a difference between the first elevation and a second elevation as the input data set, and the image data of the second elevation as the ground truth of the output. In some embodiments, the training may optimize a loss function indicative of a difference of the output image data from the model and the ground truth image data for the second elevation. Any suitable training methods can be used.

Returning to FIG. 4, in step S406, processor 304 may receive a user view request. The user view request may be received through communication interface 302. In some embodiments, the user view request may include a request by the user to tour a property virtually. The user may input that request through a VR tour application on his personal device. In response to the user review request, system 300 will render a 3D model from image data for a viewpoint suitable for the user, in steps S408-S410.

In step S408, processor 304 determines second image data for a second viewpoint determined from the user view request. In some embodiments, step S408 may be performed by the viewpoint estimation unit 342 and image data estimation unit 344. For example, viewpoint estimation unit 342 may determine the second viewpoint as a viewpoint suitable for the user who sends the user view request. In some embodiments, the second viewpoint may be determined according to the user height. Image data estimation unit 344 may the map the elevation of the second viewpoint to those second predetermined elevations to identify one that is closest to it. The image data, as generated in step S404, of that identified second predetermined elevation, is adopted as the second image data. An exemplary process for performing step S408 based on the user height is shown in FIG. 6.

Figure 6:
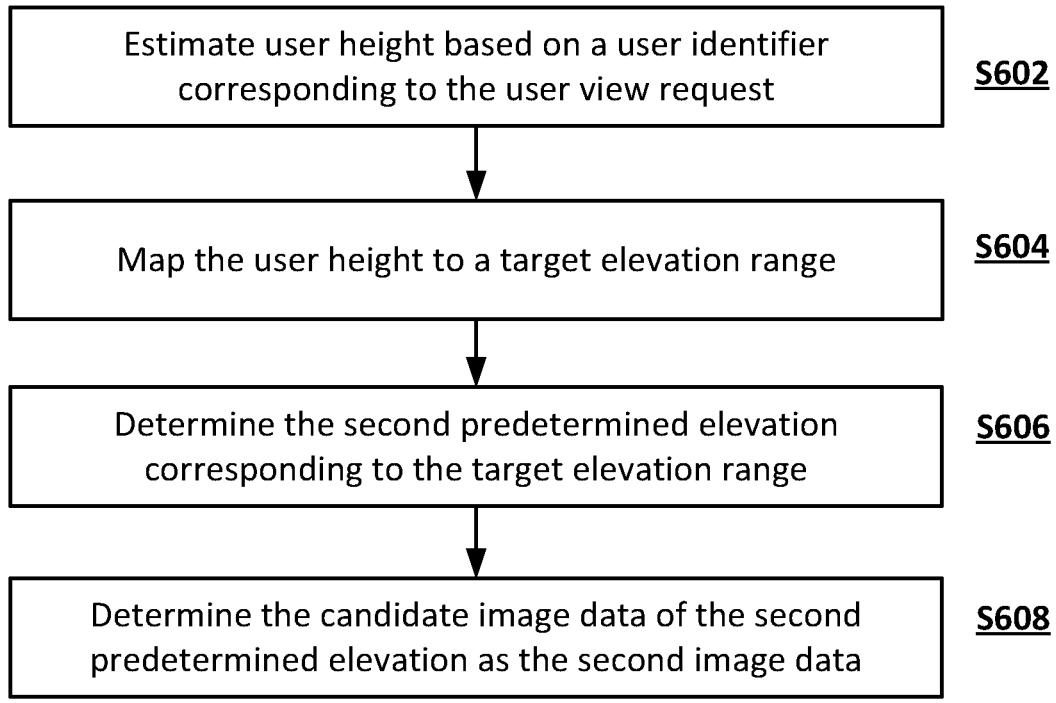
FIG. 6 is a flowchart of an exemplary method for determining image data in response to a user view request, according to embodiments of the disclosure.

FIG. 6 is a flowchart of an exemplary method 600 for determining image data in response to a user view request, according to embodiments of the disclosure. Method 600 may be implemented by viewpoint estimation unit 342 and image data estimation unit 344 to perform step S408 of method 400. Method 600 may include steps S602-S608 as described below. It is to be appreciated that some of the steps may be optional to perform the disclosure provided herein. Further, some of the steps may be performed simultaneously, or in a different order than shown in FIG. 6.

In step S602, viewpoint estimation unit 342 determines a user height associated with the user view request. Different users behind the user view request may have different heights. For example, a male user may be taller than a female user. Even among female users, the height range could be pretty broad, from petites to tall women. Therefore, for better user experience, the second viewpoint may be determined based on the user height, so that the model can be rendered from his/her viewpoint.

In the VR app, users may be managed with user identifications (user ID). When a first-time user registers and logs in, a unique user ID is assigned to him/her. To improve the storage efficiency, the user ID may be released and reassigned to another new user, if the user does not log in again within a certain time period (e.g., one month, three months, 6 months, etc.) When an existing user logs in, the user ID may be automatically detected and user information stored with its user profile may be retrieved.

In some embodiments, the user height may be determined based on the user information associated with the user identification included in or linked to the user view request. For example, if the user is an existing user and already has a registered profile, viewpoint estimation unit 342 may automatically detect its user identification and obtain the user information stored in the user profile according to the user identification. In some embodiments, the user height may be inquired from the user and the user may input the height through the app. For example, when a first-time user logs in, viewpoint estimation unit 342 may find no associated user identification (or height information). As another example, while the user identification exists, user information associated with the user identification is not prestored. In those cases, processor 304 may prompt the user to input his/her height. The height will be stored as part of the user profile associated with the assigned user identification. In yet some alternative embodiments, the user height may be automatically estimated from, e.g., an image of the user. For example, the app may take a photo of the user, and the height can be estimated from the photo through image analysis.

In some alternative embodiments, instead of estimating the user height and determining the second elevation based thereon, processor 304 may request the user to provide or select the second elevation. For example, the VR app may present several options of the second elevation to the user for the user to select (e.g., through touch buttons or a scroll-down bar) or a dialogue window for the user to type in a value for the second elevation.

In some embodiments, viewpoint estimation unit 342 further determines a height of the user's eye based on the user height. For example, the height of the user's eye may be estimated using a preprogramed formula. The formular may be slightly different for male or female users. Therefore, in some embodiments, before determining the height of the user's eye, viewpoint estimation unit 342 may determine the gender of the user based on, e.g., the user information obtained using the user identification. For example, for a male user, the height of the user's eye=user height-12 cm, and for a female user, the height of the user's eye=user height-11 cm. As another example, the height of the user's eye may be estimated as a predetermined percentage (e.g., 93%) of the user's height. The formula or percentage may be statistically determined. In some embodiments, the height of the user's eye (rather than the full user height) may be used as the elevation of the second viewpoint for determining the image data for rendering the 3D model in step S604.

In step S604, image data estimation unit 344 may map the estimated user height (or the height of the user's eye) to a target elevation range. In some embodiments, each second predetermined elevation selected in step S404 may be associated with an elevation range, e.g., between a starting elevation and an end elevation. The elevation range of a second predetermined elevation will encompass the second predetermined elevation, e.g., with it being the middle value of the elevation range. In some embodiments, the range can include one or both of the bounds, e.g., (starting elevation, end elevation], [starting elevation, end elevation), or [starting elevation, end elevation]. In some embodiments, the elevation ranges for two adjacent second predetermined elevation can be designed to be continuous, with no gap and no overlap in between. For example, if the second predetermined elevations are 150 cm, 160 cm, and 170 cm, their associated elevations ranges can be [150 cm, 160 cm), [160 cm, 170 cm), and [170 cm, 180 cm).

To map the estimated user height to a target elevation range, image data estimation unit 344 may determine if the user height falls within the elevation range associated with any second predetermined elevation. For example, if the estimated user height is 163 cm, and the second predetermined elevations are 150 cm, 160 cm, and 170 cm and their associated elevations ranges are [150 cm, 160 cm), [160 cm, 170 cm), and [170 cm, 180 cm), the user height falls within the range of the elevation 160 cm. Accordingly, 160 cm can be identified as the elevation of the second viewpoint most suitable for the user to view the scene.

In step S608, image data estimation unit 344 may determine the candidate image data of the second predetermined elevation determined in step S608 as the second image data. In the example above, if 160 cm is identified as the second predetermined elevation, the image data obtained using the conversion step (step S404) for 160 cm will be used as the second image data for rendering a 3D model in step S410 of method 400.

Returning to FIG. 4, in step S410, 3D model rendering unit 346 may render and display a 3D model (e.g., 3D model 110 shown in FIG. 2) based on the second image data for the second viewpoint, e.g., determined using method 600. In some embodiments, the model can be rendered using surface reconstruction methods that reconstruct a 3D surface of the object to obtain the model. For example, polygon mesh reconstruction methods may be used. The rendered 3D model may be display to the user on a display, e.g., display 303. The user can view and, in some embodiments, interact with the view. For example, the user may touch the display screen or otherwise control the display to view the 3D model at different view angles. Because the 3D model is rendered from image data as if it is captured from the user's eye as the viewpoint, the user will be able to view the scene at the most comfortable height. Accordingly, user experience is improved.

Method 400 uses an off-line approach that converts the first image data to candidate image data for multiple second predetermined elevations ahead of time (i.e., "off-line"), and later when a specific user view request is received, mapping the user height to those second predetermined elevations to quickly determine the second image data that suits the view request. The off-line has the benefit of saving processing time in real-time and thus be able to provide the user with the request view without delay. However, it is contemplated that an online approach can be alternatively used, in which the image data conversion can be performed in real-time after the user view request is received. Compared to the off-line approach, the online approach avoids computation and storage of multiple image data sets for elevations that may not be later used. An example method using online approach is shown in FIG. 7.

Figure 7:
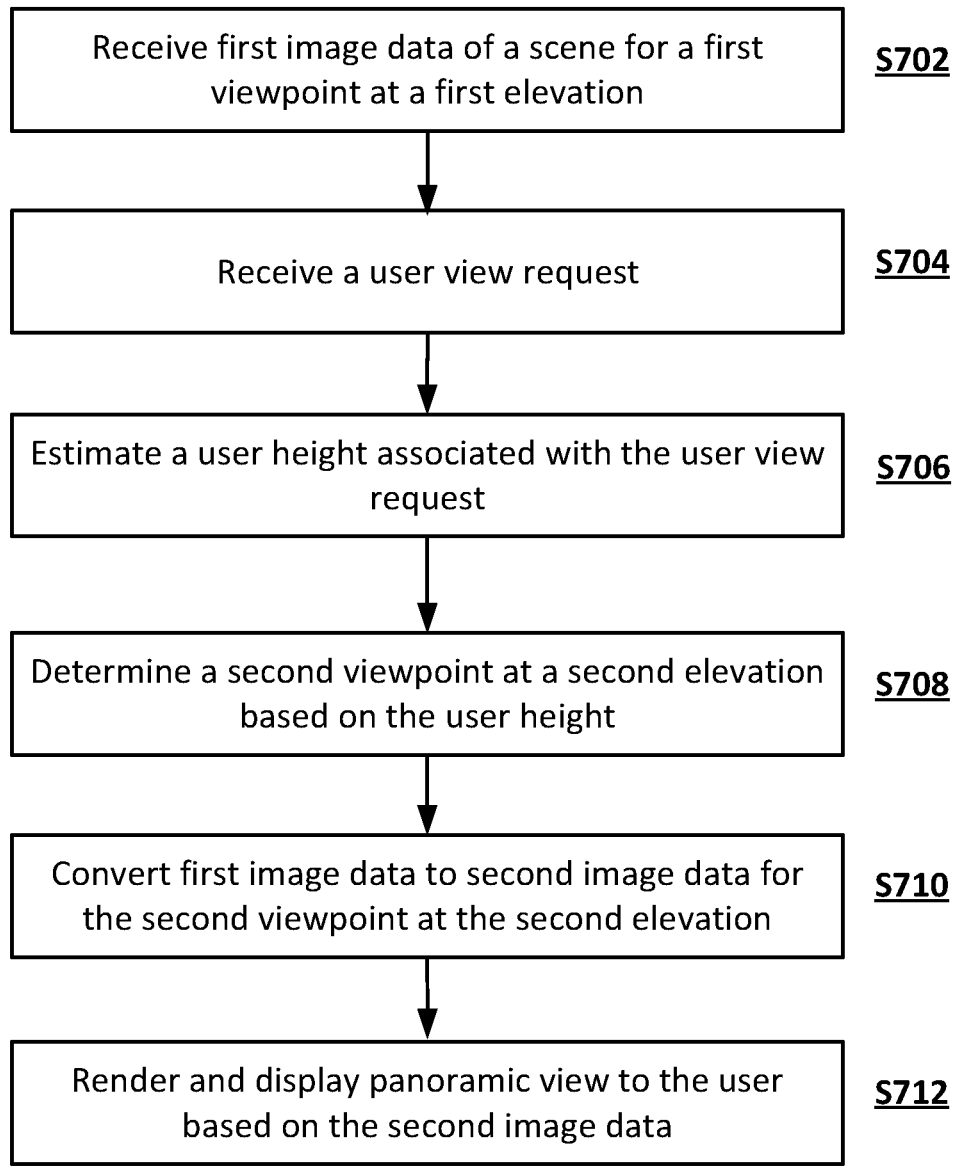
FIG. 7 is a flowchart of another exemplary method for constructing a panoramic view, according to embodiments of the disclosure.

FIG. 7 is a flowchart of another exemplary method 700 for constructing a panoramic view, according to embodiments of the disclosure. Method 700 may include steps S702-S712 as described below. It is to be appreciated that some of the steps may be optional to perform the disclosure provided herein. Further, some of the steps may be performed simultaneously, or in a different order than shown in FIG. 7.

In step S702, communication interface 302 may receive first image data of a scene for a first viewpoint at a first elevation, similar to step S402 of method 400. In step S704, processor 304 may receive a user view request. The user view request may be received through communication interface 302, similar to step S406 of method 400. In step S706, viewpoint estimation unit 342 determines a user height associated with the user view request, similar to step S602 of method 600. In step S708, viewpoint estimation unit 342 determines a second viewpoint at a second elevation. For example, the second viewpoint may be determined as the position of the user's eye, and accordingly, the second elevation is the height of the user's eye. The second viewpoint can be determined similarly to what is described above for step S602 of method 600.

In step S710, instead of mapping the second elevation to some predetermined elevations and their associated elevation ranges (as in steps S604 and S606) to determine the second image data by adopting a pre-converted candidate image data (as in step S608), image data conversion unit 340 converts the first image data for the first elevation in real-time to the second image data for the second elevation. The conversion may be performed similar to step S402 and method 500. For example, the conversion can apply a pre-trained viewpoint transformation model. Because the image data conversion is performed for a specific user height (or height of the user's eye) after receiving the user view request, image data conversion unit 340 does not need to perform image data conversion for multiple times to generate candidate image data that may or may not be used later. Accordingly, no storage of these, usually large, candidate image data is necessary. Method 700 therefore saves computational resources and storage resources when achieving a similar result as method 400.

In step S712, 3D model rendering unit 346 may render and display a 3D model based on the second image data for the second viewpoint, similar to step S410.

Another aspect of the disclosure is directed to a non-transitory computer-readable medium storing instruction which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for constructing a panoramic view based on a changing viewpoint, comprising:
a storage device configured to receive first image data of a scene captured by a stationary 3D scanner from a first viewpoint at a first predetermined elevation; and
at least one processor configured to:
convert the first image data to estimate candidate image data corresponding to the scene when viewed at one or more second predetermined elevations each different from the first predetermined elevation using a deep neural network;
receive a user view request from a user for virtually viewing the scene;
determine a second viewpoint at an elevation for the user to view the scene;
determine second image data of the scene to be viewed from the second viewpoint based on the candidate image data, by mapping the elevation of the second viewpoint to the one or more second predetermined elevations;
render the panoramic view of the scene to be viewed from the second viewpoint based on the second image data; and
display the panoramic view in response to the user view request.

2. The system of claim 1, wherein to convert the first image data to the candidate image data, the at least one processor is further configured to:
determine a relationship between the first predetermined elevation and each second predetermined elevation; and
convert the first image data to the candidate image data for each second predetermined elevation based on the respective relationship.

3. The system of claim 2, wherein the relationship between the first predetermined elevation and each second predetermined elevation is a difference in elevation between the first predetermined elevation and each second predetermined elevation.

4. The system of claim 2, wherein the at least one processor is further configured to:
form a data set using the first image data and each difference in elevation; and
transform each data set to the respective candidate image data by applying the deep learning neural network.

5. The system of claim 1, wherein the deep learning neural network is trained using sample images of a sample scene at a plurality of sample elevations.

6. The system of claim 1, wherein to determine the second viewpoint at the elevation for the user to view the scene, the at least one processor is further configured to:
estimate a user height associated with the user view request, and
map the user height to the one or more second predetermined elevations to determine the elevation of the second viewpoint.

7. The system of claim 6, wherein to estimate the user height associated with the user view request, the at least one processor is further configured to:
determine a user identification from the user view request; and
estimate the user height based on user information associated with the user identification.

8. The system of claim 7, wherein the at least one processor is further configured to:
determine that the user information associated with the user identification is not prestored; and
request the user to provide the user height.

9. The system of claim 6, wherein each second predetermined elevation is associated with an elevation range, wherein to determine the second image data of the scene to be viewed from the second viewpoint associated with the user view request, the at least one processor is further configured to:
map the user height to a target elevation range;
identify the second predetermined elevation associated with the target elevation range; and
determine the candidate image data corresponding to the scene when viewed at the identified second predetermined elevation as the second image data.

10. The system of claim 9, wherein to map the user height to a target elevation range, the at least one processor is further configured to:

estimate a height of the user's eye based on the user height; and determine the target elevation range that encompasses the height of the user's eye.

11. The system of claim 1, wherein to determine the second image data of the scene to be viewed from the second viewpoint associated with the user view request, the at least one processor is further configured to:

present a plurality of the second predetermined elevations to the user for selection;

receive a user selected second predetermined elevation; and determine the candidate image data of the scene when viewed at the user selected second predetermined elevation as the second image data.

12. A computer-implemented method for constructing a panoramic view based on a changing viewpoint, comprising:

receiving first image data of a scene captured by a stationary 3D scanner from a first viewpoint at a first predetermined elevation;

converting, by at least one processor, the first image data to estimate candidate image data corresponding to the scene when viewed at one or more second predetermined elevations each different from the first predetermined elevation using a deep learning neural network;

receiving a user view request from a user for virtually viewing the scene;

determining, by the at least one processor, a second viewpoint at an elevation for the user to view the scene;

determining, by the at least one processor, second image data of the scene to be viewed from the second viewpoint based on the candidate image data, by mapping the elevation of the second viewpoint to the one or more second predetermined elevations rendering the panoramic view of the scene to be viewed from the second viewpoint based on the second image data, and displaying the panoramic view in response to the user view request.

13. The computer-implemented method of claim 12, wherein converting the first image data to the candidate image data further comprises:

determining a relationship between the first predetermined elevation and each second predetermined elevation;

forming a data set using the first image data and each relationship; and transforming each data set to the respective candidate image data by applying the deep learning neural network.

14. The computer-implemented method of claim 12, wherein the deep learning neural network is trained using sample images of a sample scene at a plurality of sample elevations.

15. The computer-implemented method of claim 12, wherein each second predetermined elevation is associated with an elevation range, wherein determining the second image data of the scene to be viewed from the second viewpoint based on the candidate image data further comprises:

estimating a user height associated with the user view request;

mapping the user height to a target elevation range;

identifying the second predetermined elevation associated with the target elevation range; and determining the candidate image data corresponding to the scene when viewed at the identified second predetermined elevation as the second image data.

16. The computer-implemented method of claim 15, wherein estimating the user height associated with the user view request further comprises:

determining a user identification from the user view request; and estimating the user height based on user information associated with the user identification.

17. The computer-implemented method of claim 15, wherein mapping the user height to a target elevation range further comprises:

estimating a height of the user's eye based on the user height; and determining the target elevation range that encompasses the height of the user's eye.

18. The computer-implemented method of claim 12, wherein determining the second image data for the second viewpoint associated with the user view request further comprises:

presenting a plurality of the second predetermined elevations to the user for selection;

receiving a user selected second predetermined elevation; and determining the candidate image data corresponding to the scene when viewed at the user selected second predetermined elevation as the second image data.

19. A non-transitory computer-readable medium having stored thereon computer instructions, when executed by at least one processor, perform a method for constructing a panoramic view based on a changing viewpoint, the method comprising:

receiving first image data of a scene captured by a stationary 3D scanner from a first viewpoint at a first predetermined elevation;

converting the first image data to estimate candidate image data corresponding to the scene when viewed at one or more second predetermined elevations each different from the first predetermined elevation using a deep learning neural network;

receiving a user view request from a user for virtually viewing the scene;

determining a second viewpoint at an elevation for the user to view the scene;

determining second image data of the scene to be viewed from the second viewpoint based on the candidate image data, by mapping the elevation of the second viewpoint to the one or more second predetermined elevations rendering the panoramic view of the scene to be viewed from the second viewpoint based on the second image data; and display displaying the panoramic view in response to the user view request.

20. The non-transitory computer-readable medium of claim 19, wherein each second predetermined elevation is associated with an elevation range, wherein determining the second image data of the scene to be viewed from the second viewpoint based on the candidate image data further comprises:

estimating a user height associated with the user view request;

mapping the user height to a target elevation range;

identifying the second predetermined elevation associated with the target elevation range; and determining the candidate image data corresponding to the scene when viewed at the identified second predetermined elevation as the second image data.

\* \* \* \* \*